United States Patent
Li et al.

(10) Patent No.: US 11,796,645 B1
(45) Date of Patent: Oct. 24, 2023

(54) SYSTEMS AND METHODS FOR TUNING FILTERS FOR USE IN LIDAR SYSTEMS

(71) Applicant: INNOVUSION IRELAND LIMITED, Los Altos, CA (US)

(72) Inventors: Yimin Li, Cupertino, CA (US); Rui Zhang, Palo Alto, CA (US); Junwei Bao, Los Altos, CA (US)

(73) Assignee: INNOVUSION, INC., Sunnyvale, CA (US)

( * ) Notice: Subject to any disclaimer, the term of this patent is extended or adjusted under 35 U.S.C. 154(b) by 1,064 days.

(21) Appl. No.: 16/546,724

(22) Filed: Aug. 21, 2019

Related U.S. Application Data (60) Provisional application No. 62/722,498, filed on Aug. 24, 2018.

(51) Int. Cl.
*G01S 7/484* (2006.01)
*G02B 5/28* (2006.01)
*G01S 7/481* (2006.01)
*G02B 5/30* (2006.01)

(52) U.S. Cl.
CPC ............... *G01S 7/484* (2013.01); *G01S 7/481* (2013.01); *G02B 5/28* (2013.01); *G02B 5/3016* (2013.01)

(58) Field of Classification Search
CPC ............ G01S 7/484; G01S 7/481; G02B 5/28; G02B 5/3016
See application file for complete search history.

(56) References Cited

U.S. PATENT DOCUMENTS

| | | | |
|---|---|---|---|
| 3,897,150 A | 7/1975 | Bridges et al. | |
| 4,464,048 A | 8/1984 | Farlow | |
| 5,006,721 A | 4/1991 | Cameron et al. | |
| 5,157,451 A | 10/1992 | Taboada et al. | |
| 5,283,845 A * | 2/1994 | Ip | G02B 6/264 |
| | | | 385/24 |
| 5,319,434 A | 6/1994 | Croteau et al. | |
| 5,369,661 A | 11/1994 | Yamaguchi et al. | |
| 5,442,358 A | 8/1995 | Keeler et al. | |
| 5,546,188 A | 8/1996 | Wangler et al. | |
| 5,579,153 A | 11/1996 | Laming et al. | |
| 5,657,077 A | 8/1997 | DeAngelis et al. | |
| 5,793,491 A | 8/1998 | Wangler et al. | |
| 5,838,239 A | 11/1998 | Stern et al. | |
| 5,864,391 A | 1/1999 | Hosokawa et al. | |

(Continued)

FOREIGN PATENT DOCUMENTS

| | | |
|---|---|---|
| CN | 204758260 U | 11/2015 |
| CN | 204885804 U | 12/2015 |
| CN | 108132472 A | 6/2018 |
| CN | 207457508 U | 6/2018 |

(Continued)

OTHER PUBLICATIONS

"Fiber laser," Wikipedia, https://en.wikipedia.org/wiki/Fiber_laser, 6 pages.

(Continued)

*Primary Examiner* — Jamil Ahmed
(74) *Attorney, Agent, or Firm* — Mauriel Kapouytian Woods LLP; Liang Huang; Ran Pang (57) ABSTRACT

Embodiments discussed herein refer to LiDAR systems and methods that tune one or more filters to mitigate background interference. The one or more filters can be tuned to compensate for laser drift such that the narrowest possible bandpass filter can be used, thereby increasing the rejection of background interference.

21 Claims, 6 Drawing Sheets

(56) References Cited

U.S. PATENT DOCUMENTS

| | | |
|---|---|---|
| 5,926,259 A | 7/1999 | Bamberger et al. |
| 5,936,756 A | 8/1999 | Nakajima |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di Teodoro et al. |
| 7,489,865 B2 | 2/2009 | Varshneya et al. |
| 7,576,837 B2 | 8/2009 | Liu et al. |
| 7,830,527 B2 | 11/2010 | Chen |
| 7,835,068 B1 | 11/2010 | Brooks et al. |
| 7,847,235 B2 | 12/2010 | Krupkin et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu et al. |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bösch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk et al. |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,263 B2 | 1/2018 | Droz et al. |
| 9,880,278 B2 | 1/2018 | Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,194,048 B1 | 12/2021 | Burbank et al. |
| 2002/0063160 A1* | 5/2002 | Krichever et al. ...... G06K 19/04 235/462.32 |
| 2002/0136251 A1 | 9/2002 | Green et al. |
| 2003/0034398 A1* | 2/2003 | Krichever et al. ... G02B 26/007 235/462.35 |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu et al. |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Borchers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque et al. |
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bösch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |

(56) References Cited

U.S. PATENT DOCUMENTS

| | | | |
|---|---|---|---|
| 2016/0226210 | A1 | 8/2016 | Zayhowski et al. |
| 2016/0245902 | A1 | 8/2016 | Watnik et al. |
| 2016/0291134 | A1 | 10/2016 | Droz et al. |
| 2016/0313445 | A1 | 10/2016 | Bailey et al. |
| 2016/0327646 | A1 | 11/2016 | Scheim et al. |
| 2017/0003116 | A1 | 1/2017 | Yee et al. |
| 2017/0153319 | A1 | 6/2017 | Villeneuve et al. |
| 2017/0242104 | A1 | 8/2017 | Dussan |
| 2017/0299721 | A1* | 10/2017 | Eichenholz et al. H01S 3/06733 |
| 2017/0307738 | A1 | 10/2017 | Schwarz et al. |
| 2017/0365105 | A1 | 12/2017 | Rao et al. |
| 2018/0040171 | A1 | 2/2018 | Kundu et al. |
| 2018/0050704 | A1 | 2/2018 | Tascione et al. |
| 2018/0069367 | A1 | 3/2018 | Villeneuve et al. |
| 2018/0152691 | A1 | 5/2018 | Pacala et al. |
| 2018/0156896 | A1 | 6/2018 | O'Keeffe |
| 2018/0158471 | A1 | 6/2018 | Vaughn et al. |
| 2018/0164439 | A1 | 6/2018 | Droz et al. |
| 2018/0188355 | A1 | 7/2018 | Bao et al. |
| 2018/0188357 | A1 | 7/2018 | Li et al. |
| 2018/0188358 | A1 | 7/2018 | Li et al. |
| 2018/0188371 | A1 | 7/2018 | Bao et al. |
| 2018/0210084 | A1 | 7/2018 | Zwölfer et al. |
| 2018/0275274 | A1 | 9/2018 | Bao et al. |
| 2018/0284241 | A1 | 10/2018 | Campbell et al. |
| 2018/0284242 | A1 | 10/2018 | Campbell |
| 2018/0284286 | A1 | 10/2018 | Eichenholz et al. |
| 2018/0329063 | A1 | 11/2018 | Pacala et al. |
| 2018/0359460 | A1 | 12/2018 | Pacala et al. |
| 2019/0025428 | A1 | 1/2019 | Li et al. |
| 2019/0107607 | A1 | 4/2019 | Danziger |
| 2019/0107623 | A1 | 4/2019 | Campbell et al. |
| 2019/0120942 | A1 | 4/2019 | Zhang et al. |
| 2019/0120962 | A1 | 4/2019 | Gimpel et al. |
| 2019/0154804 | A1 | 5/2019 | Eichenholz |
| 2019/0154807 | A1 | 5/2019 | Steinkogler et al. |
| 2019/0212416 | A1 | 7/2019 | Li et al. |
| 2019/0250254 | A1 | 8/2019 | Campbell et al. |
| 2019/0257924 | A1 | 8/2019 | Li et al. |
| 2019/0265334 | A1 | 8/2019 | Zhang et al. |
| 2019/0265336 | A1 | 8/2019 | Zhang et al. |
| 2019/0265337 | A1 | 8/2019 | Zhang et al. |
| 2019/0265339 | A1 | 8/2019 | Zhang et al. |
| 2019/0277952 | A1 | 9/2019 | Beuschel et al. |
| 2019/0310368 | A1 | 10/2019 | LaChapelle |
| 2019/0369215 | A1 | 12/2019 | Wang et al. |
| 2019/0369258 | A1 | 12/2019 | Hall et al. |
| 2019/0383915 | A1 | 12/2019 | Li et al. |
| 2020/0142070 | A1 | 5/2020 | Hall et al. |
| 2020/0256964 | A1 | 8/2020 | Campbell et al. |
| 2020/0284906 | A1 | 9/2020 | Eichenholz et al. |
| 2020/0319310 | A1 | 10/2020 | Hall et al. |
| 2020/0400798 | A1 | 12/2020 | Rezk et al. |
| 2021/0088630 | A9 | 3/2021 | Zhang |

FOREIGN PATENT DOCUMENTS

| | | |
|---|---|---|
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| EP | 0 757 257 A2 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2000411 | 1/1979 |
| JP | 2007144667 A | 6/2007 |
| JP | 2010035385 A | 2/2010 |
| JP | 2017-003347 A | 1/2017 |
| JP | 2017-138301 A | 8/2017 |
| KR | 10-2012-0013515 A | 2/2012 |
| KR | 10-2013-0068224 A | 6/2013 |
| KR | 10-2018-0107673 A | 10/2018 |
| WO | 2017/110417 A1 | 6/2017 |
| WO | 2018/125725 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |

OTHER PUBLICATIONS

"Mirrors", Physics LibreTexts, https://phys.libretexts.org/Bookshelves/Optics/Supplemental_Modules_(Components)/Mirrors, (2021), 2 pages.

"Why Wavelengths Matter in Fiber Optics", FirstLight, https://www.firstlight.net/why-wavelengths-matter-in-fiber-optics/, (2021), 5 pages.

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

European Search Report, dated Jul. 17, 2020, for EP Application No.18776977.3, 12 pages.

European Search Report, dated Jun. 17, 2021, for EP Application No.18868896.4, 7 pages.

Extended European Search Report, dated Jul. 10, 2020, for EP Application No.18736738.8, 9 pages.

Extended European Search Report, dated Jul. 22, 2020, for EP Application No.18736685.1, 10 pages.

Gluckman, J. (May 13, 2016). "Design of the processing chain for a high-altitude, airborne, single-photon lidar mapping instrument," Proceedings of SPIE; [Proceedings of SPIE ISSN 0277-786X Volume 10524], SPIE, US, vol. 9832, 9 pages.

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.

(56) References Cited

OTHER PUBLICATIONS

Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X Volume 10524], SPIE, US, vol. 9751, pages 975119-975119-8.

International Preliminary Report on Patentability, dated Apr. 30, 2020, for International Application No. PCT/US2018/056577, 8 pages.

International Preliminary Report on Patentability, dated Jul. 9, 2019, for International Application No. PCT/US2018/012703, 10 pages.

International Preliminary Report on Patentability, dated Jul. 9, 2019, for International Application No. PCT/ S2018/012704, 7 pages.

International Preliminary Report on Patentability, dated Jul. 9, 2019, for International Application Number PCT/US2018/012705, 7 pages.

International Search Report and Written Opinion, dated Jan. 3, 2019, for International Application No. PCT/US2018/056577, 15 pages.

International Search Report and Written Opinion, dated Jan. 17, 2020, for International Application No. PCT/US2019/019276, 14 pages.

International Search Report and Written Opinion, dated Jul. 9, 2019, for International Application No. PCT/US2019/018987, 17 pages.

International Search Report and Written Opinion, dated Jun. 7, 2018, for International Application No. PCT/US2018/024185, 9 pages.

International Search Report and Written Opinion, dated Mar. 19, 2018, for International Application No. PCT/US2018/012705, 12 pages.

International Search Report and Written Opinion, dated Mar. 20, 2018, for International Application No. PCT/US2018/012703, 13 pages.

International Search Report and Written Opinion, dated Mar. 23, 2018, for International Application No. PCT/US2018/012704, 12 pages.

International Search Report and Written Opinion, dated May 3, 2019, for International Application No. PCT/US2019/019272, 16 pages.

International Search Report and Written Opinion, dated May 6, 2019, for International Application No. PCT/US2019/019264, 15 pages.

International Search Report and Written Opinion, dated Sep. 18, 2018, for International Application No. PCT/US2018/012116, 12 pages.

Office Action Issued in Japanese Patent Application No. 2019-536019 dated Nov. 30, 2021, 6 pages.

\* cited by examiner

SYSTEMS AND METHODS FOR TUNING FILTERS FOR USE IN LIDAR SYSTEMS

CROSS-REFERENCE TO A RELATED APPLICATION

This application claims the benefit of U.S. Provisional Application No. 62/722,498, filed Aug. 24, 2018, the disclosure of which is incorporated herein in its entirety.

FIELD OF THE INVENTION

The present disclosure relates to light detection and ranging (LiDAR), and in particular to tuning filters for use in LiDAR systems to mitigate background interference.

BACKGROUND

Systems exist that enable vehicles to be driven semi-autonomously or fully autonomously. Such systems may use one or more range finding, mapping, or object detection systems to provide sensory input to assist in semi-autonomous or fully autonomous vehicle control. LiDAR systems, for example, can provide the sensory input required by a semi-autonomous or fully autonomous vehicle. LiDAR systems can use a laser that projects beams of light. Background interference or radiation caused by sunlight or other radiation sources can affect operational performance of the LiDAR system. What are needed are systems and methods to mitigate background interference.

BRIEF SUMMARY

Embodiments discussed herein refer to LiDAR systems and methods that tune one or more filters to mitigate background interference. The one or more filters can be tuned to compensate for laser drift such that the narrowest possible bandpass filter can be used, thereby increasing the rejection of background interference.

In one embodiment, a LiDAR system is provided that includes a light source, a signal steering system that directs light pulses originating from the light source to a location within a field of view, wavelength monitoring circuitry operative to monitor a wavelength of the light pulses originating from the light source, receiving system operative to receive and detect return pulses, and filter tuning circuitry. The receiving system can include a first optic, tunable filter, second optic, and detector. The filter tuning circuitry can be operative to adjust a filter characteristic of the tunable filter based on the monitored wavelength.

In another embodiment, a method for using a LiDAR system is provided that can be capable of monitoring a wavelength of light pulses originating from a light source, and adjusting a filter characteristic of a tunable filter based on the monitored wavelength, wherein the tunable filter is located within a return path of the LiDAR system, and wherein the filter characteristic is selected to mitigate background noise existing within a field of view of the LiDAR system.

A further understanding of the nature and advantages of the embodiments discussed herein may be realized by reference to the remaining portions of the specification and the drawings.

DETAILED DESCRIPTION

Illustrative embodiments are now described more fully hereinafter with reference to the accompanying drawings, in which representative examples are shown. Indeed, the disclosed LiDAR systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Some light detection and ranging (LiDAR) systems use a single light source to produce one or more light signals of a single wavelength that scan the surrounding environment. The signals are scanned using steering systems that direct the pulses in one or two dimensions to cover an area of the surrounding environment (the scan area). When these systems use mechanical means to direct the pulses, the system complexity increases because more moving parts are required. Additionally, only a single signal can be emitted at any one time because two or more identical signals would introduce ambiguity in returned signals. In some embodiments of the present technology, these disadvantages and/or others are overcome.

For example, some embodiments of the present technology use one or more light sources that produce light signals of different wavelengths and/or along different optical paths. These light sources provide the signals to a signal steering system at different angles so that the scan areas for the light signals are different (e.g., if two light sources are used to create two light signals, the scan area associated with each light source is different). This allows for tuning the signals to appropriate transmit powers and the possibility of having overlapping scan areas that cover scans of different distances. Longer ranges can be scanned with signals having higher power and/or slower repetition rate (e.g., when using pulsed light signals). Shorter ranges can be scanned with signals having lower power and/or high repetition rate (e.g., when using pulse light signals) to increase point density.

As another example, some embodiments of the present technology use signal steering systems with one or more dispersion elements (e.g., gratings, optical combs, prisms, etc.) to direct pulse signals based on the wavelength of the pulse. A dispersion element can make fine adjustments to a pulse's optical path, which may be difficult or impossible with mechanical systems. Additionally, using one or more dispersion elements allows the signal steering system to use few mechanical components to achieve the desired scanning capabilities. This results in a simpler, more efficient (e.g., lower power) design that is potentially more reliable (due to few moving components).

Figure 1:
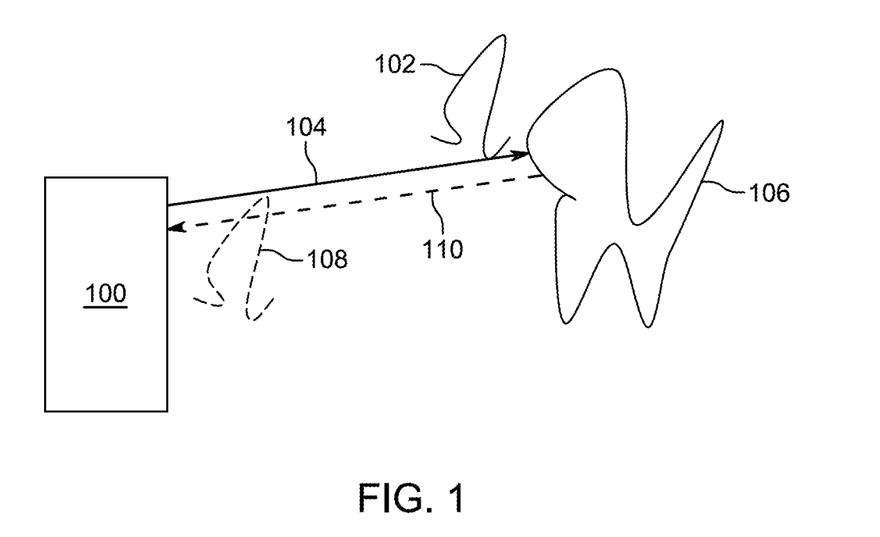
FIGS. 1-3 illustrate an exemplary LiDAR system using pulse signals to measure distances to points in the outside environment.

Some LiDAR systems use the time-of-flight of light signals (e.g., light pulses) to determine the distance to objects in the path of the light. For example, with respect to FIG. 1, an exemplary LiDAR system 100 includes a laser light source (e.g., a fiber laser), a steering system (e.g., a system of one or more moving mirrors), and a light detector (e.g., a photon detector with one or more optics). LiDAR system 100 transmits light pulse 102 along path 104 as determined by the steering system of LiDAR system 100. In the depicted example, light pulse 102, which is generated by the laser light source, is a short pulse of laser light. Further, the signal steering system of the LiDAR system 100 is a pulse signal steering system. However, it should be appreciated that LiDAR systems can operate by generating, transmitting, and detecting light signals that are not pulsed can be used to derive ranges to object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulses also may be applicable to LiDAR systems that do not use one or both of these techniques.

Referring back to FIG. 1 (a time-of-flight LiDAR system that uses light pulses) when light pulse 102 reaches object 106, light pulse 102 scatters and returned light pulse 108 will be reflected back to system 100 along path 110. The time from when transmitted light pulse 102 leaves LiDAR system 100 to when returned light pulse 108 arrives back at LiDAR system 100 can be measured (e.g., by a processor or other electronics within the LiDAR system). This time-of-flight combined with the knowledge of the speed of light can be used to determine the range/distance from LiDAR system 100 to the point on object 106 where light pulse 102 scattered.

Figure 2:
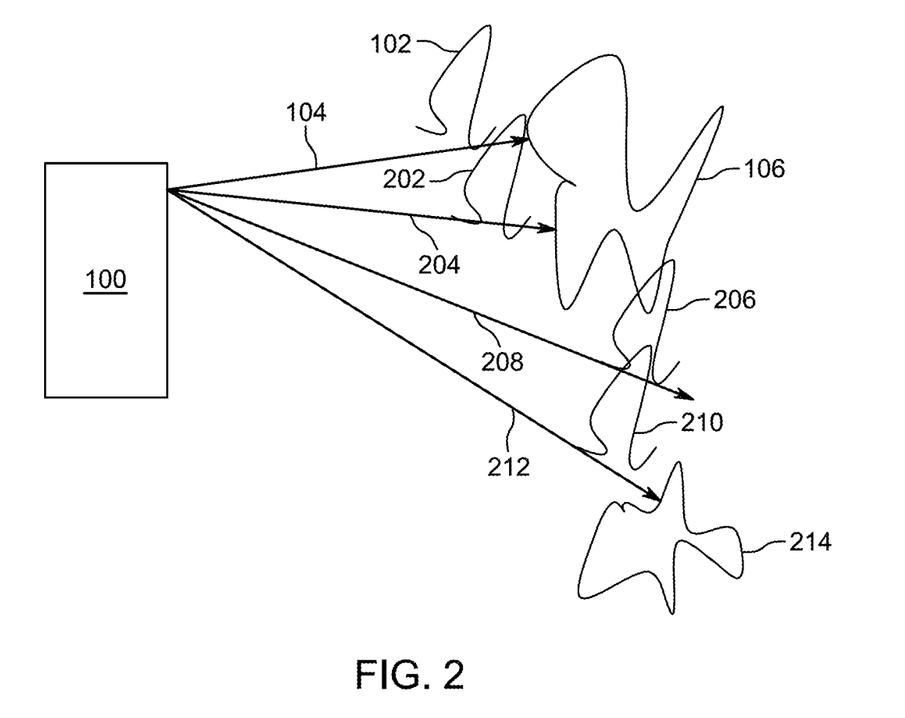
Figure 3:
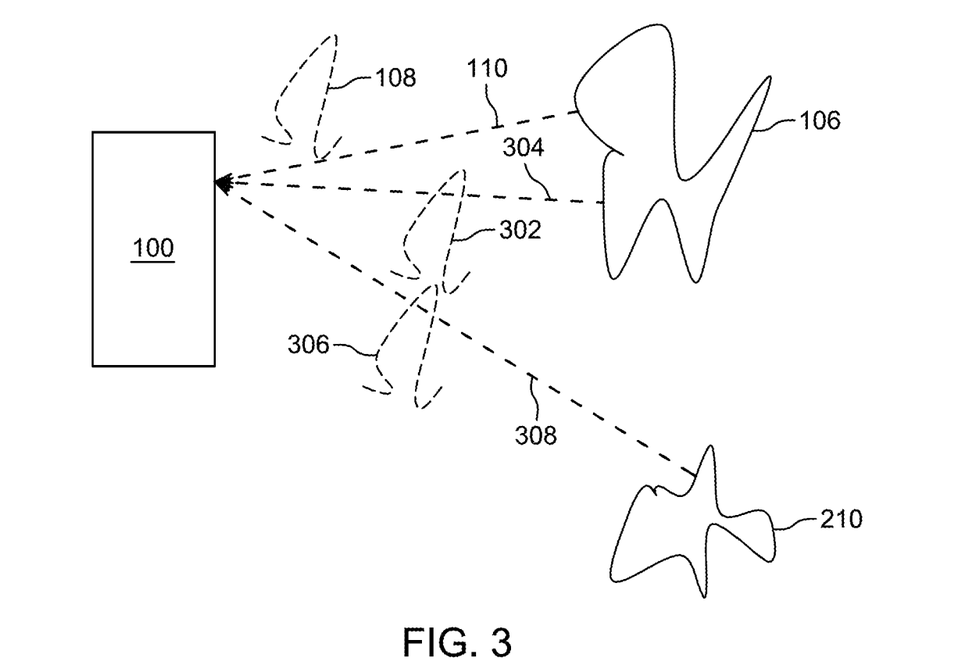

By directing many light pulses, as depicted in FIG. 2, LiDAR system 100 scans the external environment (e.g., by directing light pulses 102, 202, 206, 210 along paths 104, 204, 208, 212, respectively). As depicted in FIG. 3, LiDAR system 100 receives returned light pulses 108, 302, 306 (which correspond to transmitted light pulses 102, 202, 210, respectively) back after objects 106 and 214 scatter the transmitted light pulses and reflect pulses back along paths 110, 304, 308, respectively. Based on the direction of the transmitted light pulses (as determined by LiDAR system 100) as well as the calculated range from LiDAR system 100 to the points on objects that scatter the light pulses (e.g., the points on objects 106 and 214), the surroundings within the detection range (e.g., the field of view between path 104 and 212, inclusively) can be precisely plotted (e.g., a point cloud or image can be created).

If a corresponding light pulse is not received for a particular transmitted light pulse, then it can be determined that there are no objects that can scatter sufficient amount of signal for the LiDAR light pulse within a certain range of LiDAR system 100 (e.g., the max scanning distance of LiDAR system 100). For example, in FIG. 2, light pulse 206 will not have a corresponding returned light pulse (as depicted in FIG. 3) because it did not produce a scattering event along its transmission path 208 within the predetermined detection range. LiDAR system 100 (or an external system communication with LiDAR system 100) can interpret this as no object being along path 208 within the detection range of LiDAR system 100.

In FIG. 2, transmitted light pulses 102, 202, 206, 210 can be transmitted in any order, serially, in parallel, or based on other timings with respect to each other. Additionally, while FIG. 2 depicts a 1-dimensional array of transmitted light pulses, LiDAR system 100 optionally also directs similar arrays of transmitted light pulses along other planes so that a 2-dimensional array of light pulses is transmitted. This 2-dimentional array can be transmitted point-by-point, line-by-line, all at once, or in some other manner. The point cloud or image from a 1-dimensional array (e.g., a single horizontal line) will produce 2-dimensional information (e.g., (1) the horizontal transmission direction and (2) the range to objects). The point cloud or image from a 2-dimensional array will have 3-dimensional information (e.g., (1) the horizontal transmission direction, (2) the vertical transmission direction, and (3) the range to objects).

The density of points in point cloud or image from a LiDAR system 100 is equal to the number of pulses divided by the field of view. Given that the field of view is fixed, to increase the density of points generated by one set of transmission-receiving optics, the LiDAR system should fire a pulse more frequently, in other words, a light source with a higher repetition rate is needed. However, by sending pulses more frequently the farthest distance that the LiDAR system can detect may be more limited. For example, if a returned signal from a far object is received after the system transmits the next pulse, the return signals may be detected in a different order than the order in which the corresponding signals are transmitted and get mixed up if the system cannot correctly correlate the returned signals with the transmitted signals. To illustrate, consider an exemplary LiDAR system that can transmit laser pulses with a repetition rate between 500 kHz and 1 MHz. Based on the time it takes for a pulse to return to the LiDAR system and to avoid mix-up of returned pulses from consecutive pulses in conventional LiDAR design, the farthest distance the LiDAR system can detect may be 300 meters and 150 meters for 500 kHz and 1 Mhz, respectively. The density of points of a LiDAR system with 500 kHz repetition rate is half of that with 1 MHz. Thus, this example demonstrates that, if the system cannot correctly correlate returned signals that arrive out of order, increasing the repetition rate from 500 kHz to 1 MHz (and thus improving the density of points of the system) would significantly reduce the detection range of the system.

Figure 4:
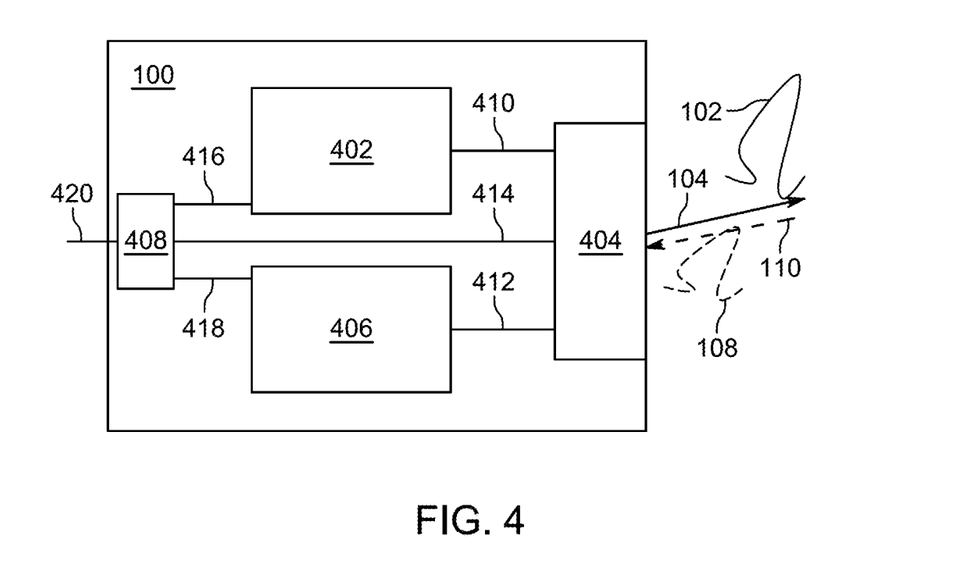
FIG. 4 depicts a logical block diagram of the exemplary LiDAR system.

FIG. 4 depicts a logical block diagram of LiDAR system 100, which includes light source 402, signal steering system 404, pulse detector 406, and controller 408. These components are coupled together using communications paths 410, 412, 414, 416, and 418. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 410 is one or more optical fibers, communication path 412 represents an optical path, and communication paths 414, 416, 418, and 420 are all one or more electrical wires that carry electrical signals. The communications paths can also include more than one of the above types of communication mediums (e.g., they can include an optical fiber and an optical path or one or more optical fibers and one or more electrical wires).

LiDAR system 100 can also include other components not depicted in FIG. 4, such as power buses, power supplies, LED indicators, switches, etc. Additionally, other connections among components may be present, such as a direct connection between light source 402 and light detector 406 so that light detector 406 can accurately measure the time from when light source 402 transmits a light pulse until light detector 406 detects a returned light pulse. Light source 402 may use diode lasers or fiber lasers to generate light pulses.

Signal steering system 404 includes any number of components for steering light signals generated by light source 402. In some examples, signal steering system 404 may include one or more optical redirection elements (e.g., mirrors or lens) that steer light pulses (e.g., by rotating, vibrating, or directing) along a transmit path to scan the external environment. For example, these optical redirection elements may include MEMS mirrors, rotating polyhedron mirrors, or stationary mirrors to steer the transmitted pulse signals to different directions. Signal steering system 404 optionally also includes other optical components, such as dispersion optics (e.g., diffuser lenses, prisms, or gratings) to further expand the coverage of the transmitted signal in order to increase the LiDAR system 100's transmission area (i.e., field of view). In some examples, signal steering system 404 does not contain any active optical components (e.g., it does not contain any amplifiers). In some other examples, one or more of the components from light source 402, such as a booster amplifier, may be included in signal steering system 404. In some instances, signal steering system 404 can be considered a LiDAR head or LiDAR scanner.

Some implementations of signal steering systems include one or more optical redirection elements (e.g., mirrors or lens) that steers returned light signals (e.g., by rotating, vibrating, or directing) along a receive path to direct the returned light signals to the light detector. The optical redirection elements that direct light signals along the transmit and receive paths may be the same components (e.g., shared), separate components (e.g., dedicated), and/or a combination of shared and separate components. This means that in some cases the transmit and receive paths are different although they may partially overlap (or in some cases, substantially overlap).

Controller 408 contains components for the control of LiDAR system 100 and communication with external devices that use the system. For example, controller 408 optionally includes one or more processors, memories, communication interfaces, sensors, storage devices, clocks, ASICs, FPGAs, and/or other devices that control light source 402, signal steering system 404, and/or light detector 406. In some examples, controller 408 controls the power, rate, timing, and/or other properties of light signals generated by light source 402; controls the speed, transmit direction, and/or other parameters of light steering system 404; and/or controls the sensitivity and/or other parameters of light detector 406.

Controller 408 optionally is also configured to process data received from these components. In some examples, controller determines the time it takes from transmitting a light pulse until a corresponding returned light pulse is received; determines when a returned light pulse is not received for a transmitted light pulse; determines the transmitted direction (e.g., horizontal and/or vertical information) for a transmitted/returned light pulse; determines the estimated range in a particular direction; and/or determines any other type of data relevant to LiDAR system 100.

Figure 5:
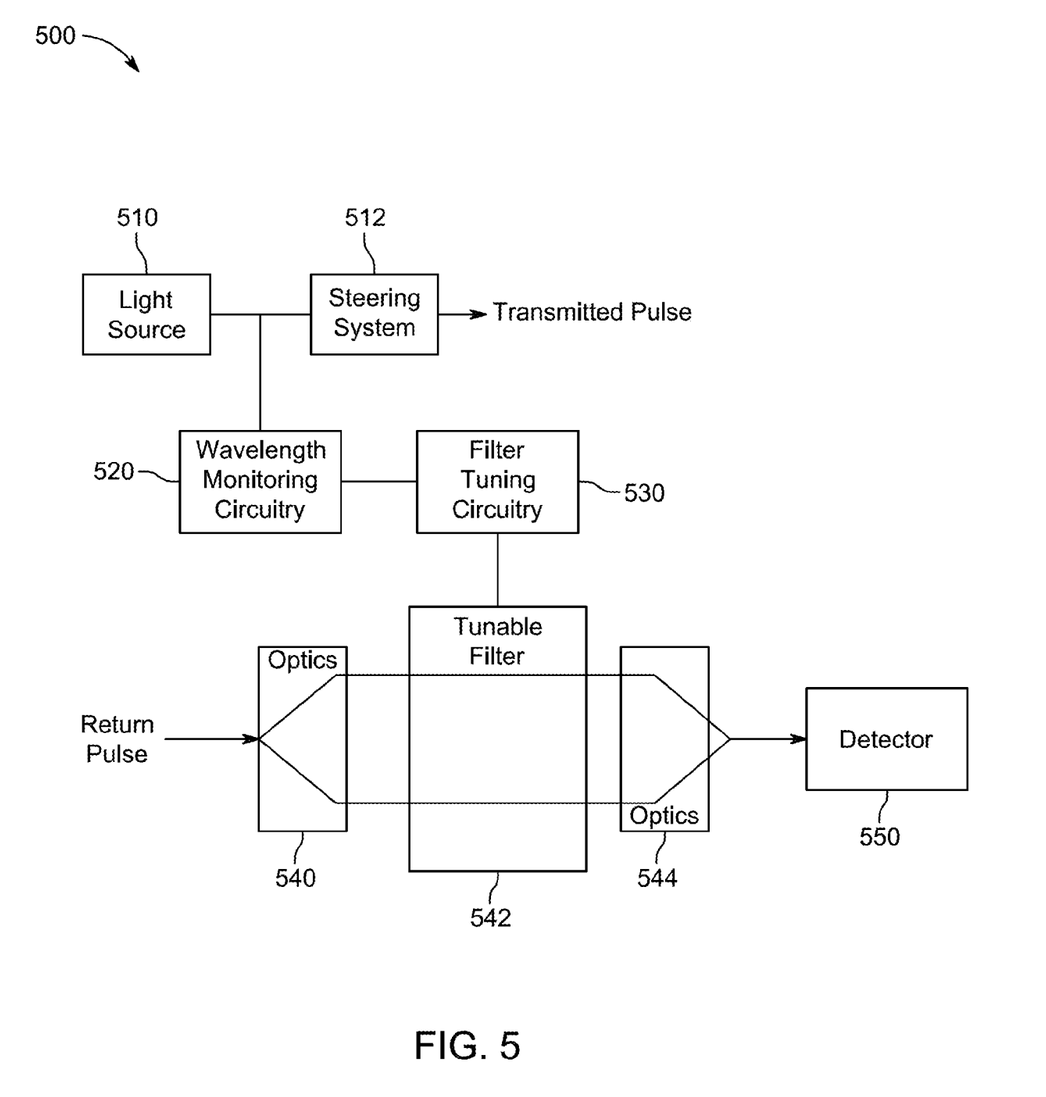
FIG. 5 shows an illustrative block diagram of LiDAR system according to an embodiment.

FIG. 5 shows an illustrative block diagram of LiDAR system 500 according to an embodiment. LiDAR system 500 can include light source 510, steering system 512, wavelength monitoring circuitry 520, filter tuning circuitry 530, optical lens 540 and 544, tunable filter 542, and detector 550. A transmission path can include light source 510 and steering system 512. Transmitted light pulses are projected from steering system 512 to locations within a field of view of LiDAR system 500. Return pulses are received via a receive path, which may include optics 540 and 544, tunable filter 542, and detector 550. Though not shown in FIG. 5, the return path can include portions of the transmission path (e.g., such as steering system 512). In some embodiments, one of optics 540 and 544 may be omitted. In another embodiment, additional optics may be included.

Figure 6:
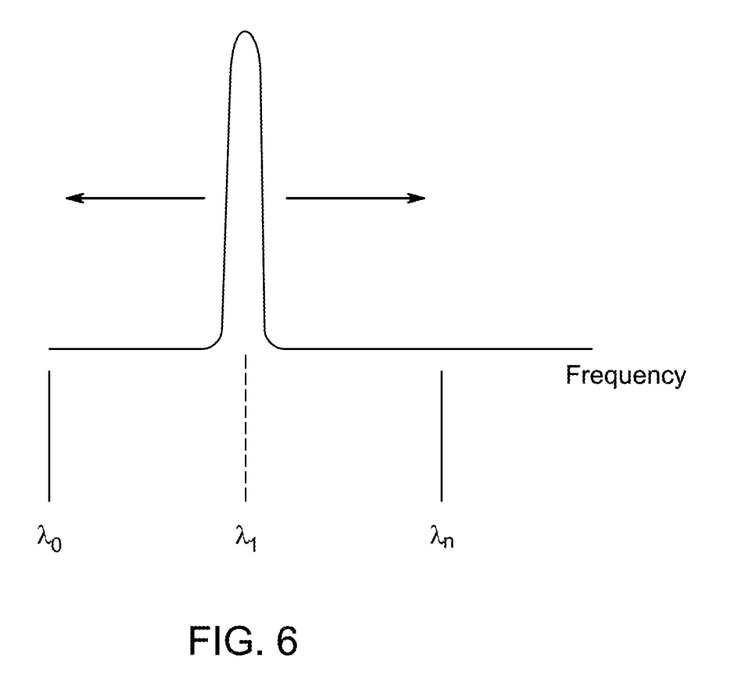
FIG. 6 shows a graph showing wavelength of a light source centered on frequency according to an embodiment.

Wavelength monitoring circuitry 520 can determine the wavelength of the light pulses originating from light source 510. Although light source 510 is designed to emit light at particular wavelength with fairly narrow linewidth, temperature variations can cause the wavelength to drift. For example, referring briefly to FIG. 6, which shows an illustrative frequency shift diagram of a light source. As shown in FIG. 6, the wavelength of the light source is centered on frequency, $\lambda_1$. However, due to temperature fluctuations, the wavelength of the light source can range anywhere between $\lambda_0$ and $\lambda_n$. The temperature fluctuations may be caused by the ambient environment in which LiDAR system 500 resides. For example, if the LiDAR system is integrated in a vehicle, temperatures can range widely (e.g., -40C to 85C). Thus, in order for returned pulses to be processed by the receive path, any filters that are used need to accommodate for the shift in wavelength. Conventional approaches use relatively wideband filters that take into account the entirety of the potential wavelength drift. The downside of such an approach, however, is that it also allows for background noise and/or radiation to pass through the receive path. Embodiments discussed herein eliminate or at least substantially mitigate passage of background radiation by using the combination of wavelength monitoring circuitry 520, filter tuning circuitry 530, and tunable filter 542.

Referring now back to FIG. 5, tunable filter 542 can be adjusted by filter tuning circuitry 530 in response to the detected wavelength (ascertained by wave length monitoring circuitry). The linewidth of passband is determined in such a way that it can cover the laser intrinsic linewidth. Thus depending on the monitored wavelength, filter tuning circuitry 530 can adjust one or more characteristics of tunable filter 542 such that it "follows" the center wavelength of laser, thereby providing a relatively narrow bandpass filter that allows the returns pulses that match the wavelength of the transmitted pulses to pass through tunable filter 542. As the wavelength changes, the tunable filter 542 also changes to maintain the relatively narrow bandpass filter. For example, the width of the narrow bandpass filter can be around 2 nanometers. Since tunable filter 542 is tuned specifically for the wavelength originating from light source 510, any other background radiation or noise is filtered out because it cannot pass though filter 542.

Figure 7:
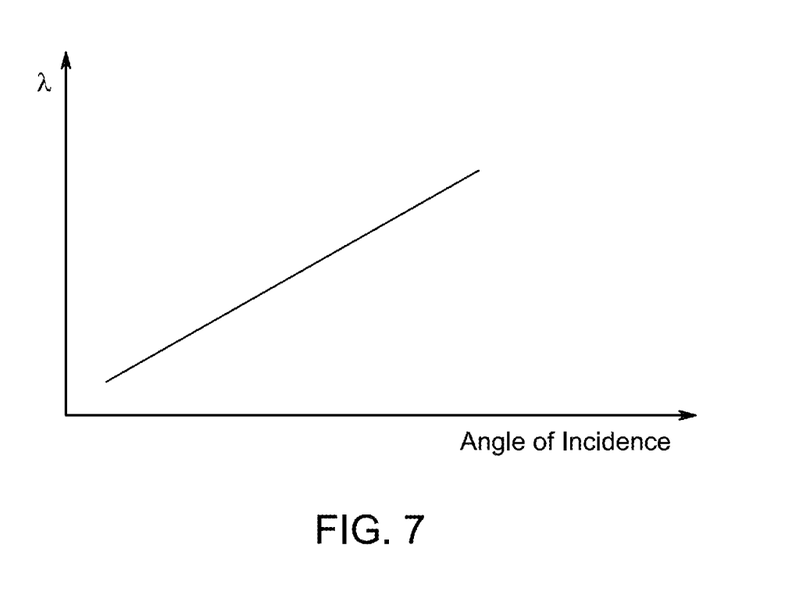
FIG. 7 shows illustrative graph of wavelength versus angle of incidence according to an embodiment.

In some embodiments, filter tuning circuitry 530 may access a look up table to determine the extent to which tunable filter 542 should be modified to follow the wavelength of light source 510. For example, the look up table can be based on the illustrative wavelength versus angle of incidence graph shown in FIG. 7. For a given wavelength, $\lambda$, the angle of incidence for the filter is known. With knowledge of the angle of incidence for a given wavelength, tuning circuitry 530 can adjust tunable filter 542 so that it matches the angle of incidence corresponding to the wavelength.

Figure 8:
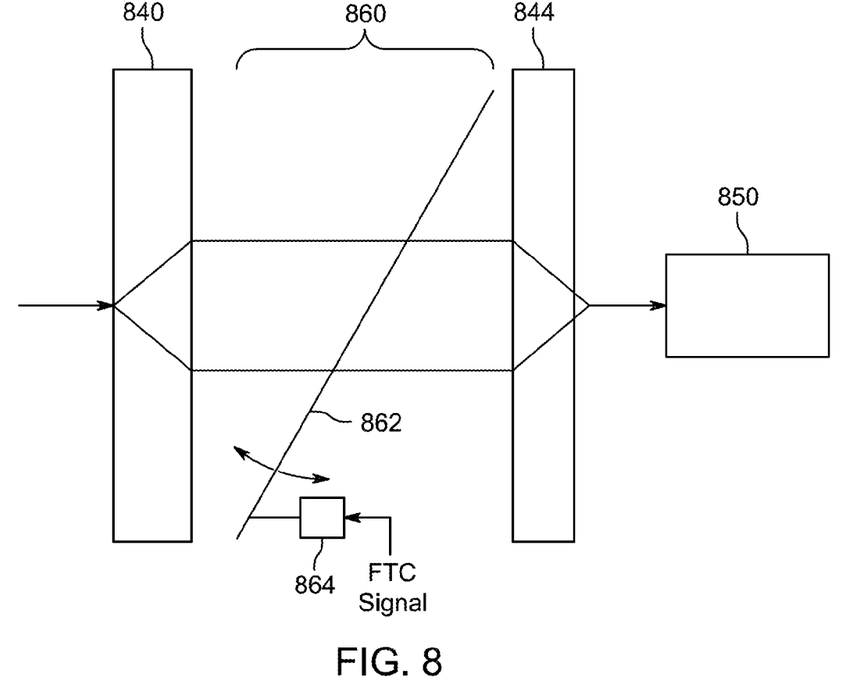
FIGS. 8 and 9 show views of different return paths of a LiDAR system according to various embodiments.

FIG. 8 shows a view of a return path of a LiDAR system according to an embodiment. In particular, FIG. 8 shows optics 840 and 844, detector 850, and tunable filter system 860. Tunable filter system 860 can include interference filter 862 and movement member 864. Interference filter can be a polarized filter, for example. Movement member 864 can move interference filter 862 in the directions of the arrows (as shown). For example, movement member 864 may be a screw-drive, a pulley drive, a track drive, or any other suitable drive system. Moving interference filter 862 changes the angle of incidence. Thus, movement member 864 may receive signals from filter tuning circuitry (FTC) (not shown) to position filter 862 in the appropriate position to "follow" the wavelength of light being emitted by a light source (e.g., light source 510). That is, the FTC signals instructs movement member 864 to position filter 862 such that its angle of incidence corresponds to the wavelength monitored by the wavelength monitoring circuitry.

Figure 9:
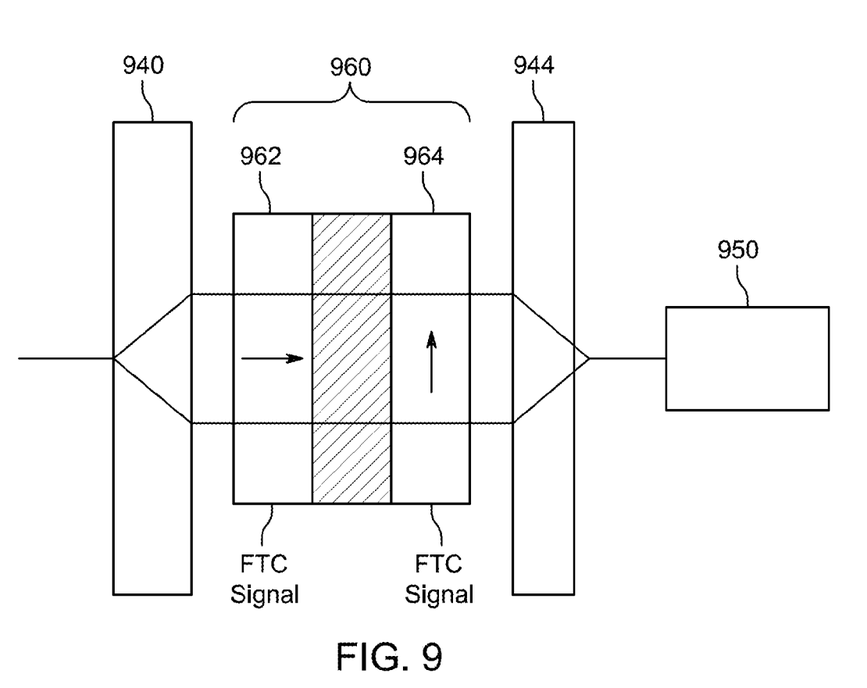

FIG. 9 shows a view of another return path of a LiDAR system according to an embodiment. In particular, FIG. 9 shows optics 940 and 944, detector 950, and tunable filter system 960. Tunable filter system 960 can include polarizer 962 and 964 with a liquid crystal in between. Polarization direction of polarizers 962 and 964 are placed perpendicular to each other. Because of the birefringement of liquid crystal, only light at certain wavelength can passthrough while light at other wavelength will be extinguished. By adjusting voltage across liquid crystals that tunable filter system 960 can "follow" the wavelength of light being monitored by the wavelength monitoring circuitry.

Figure 10:
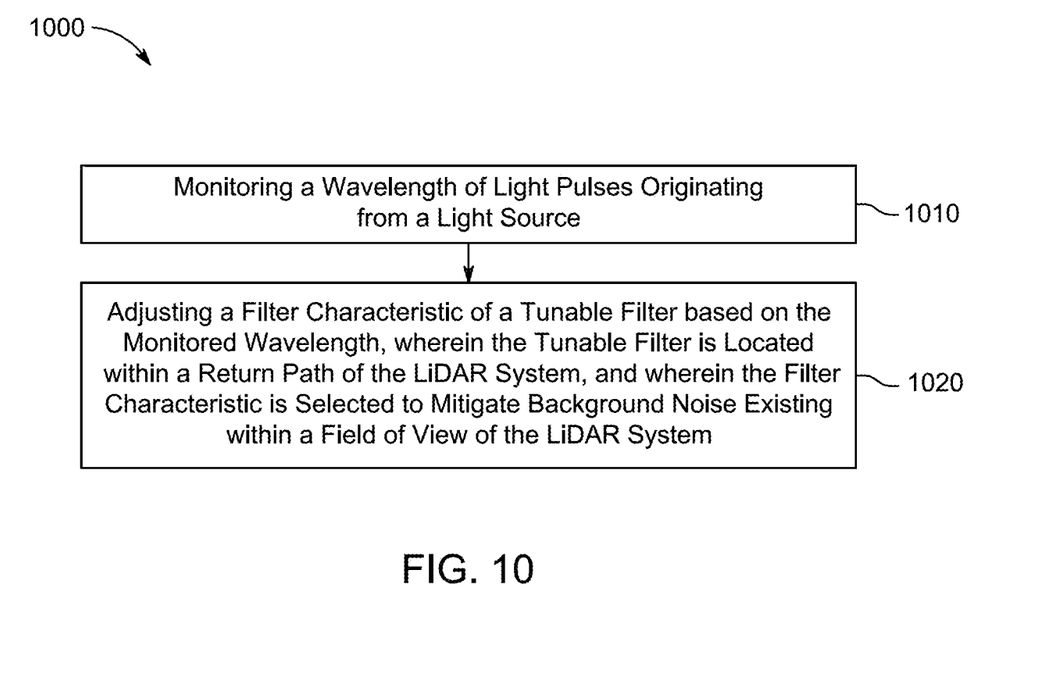
FIG. 10 shows an illustrative process for using a LiDAR system.

FIG. 10 shows illustrative process 1000 for using a LiDAR system. Starting at step 1010, a wavelength of light pulses originating from a light source is monitored. For example, wavelength monitoring circuitry 520 can monitor the wavelength of the light pulses being transmitted by a LiDAR system. At step 1020, a filter characteristic of a tunable filter can be adjusted based on the monitored wavelength, wherein the tunable filter is located within a return path of the LiDAR system, and wherein the filter characteristic is selected to mitigate background noise existing within a field of view of the LiDAR system. For example, filter tuning circuitry (e.g., circuitry 530) can determine the angle of incidence for a tunable filter (e.g., filter 542, or filter system 860 or 960) and change the filter characteristic of tunable filter to enable return pulses within a fixed wavelength (e.g., within the narrowband filter set by the tunable filter) to pass through the return path, but reject all other radiation as background noise.

It should be understood that the steps in FIG. 10 are merely illustrative and that additional steps may be added and the order to the steps may be rearranged.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-10, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A light detection and ranging (LiDAR) system, comprising:
   a light source providing light signals;
   a signal steering system operative to direct the light signals to a field of view;
   wavelength monitoring circuitry operative to:
      monitor a wavelength of the light signals provided by the light source to the signal steering system, and
      determine that the monitored wavelength of the light signals drifts from a first wavelength value to a second wavelength value, wherein the second wavelength value is different from the first wavelength value;
   a tunable filter disposed in a receiving system operative to receive return light signals; and
   filter tuning circuitry operative to adjust a filter characteristic of the tunable filter based on the monitored wavelength such that a pass band of the tunable filter matches the second wavelength value.

2. The system of claim 1, wherein the monitored wavelength of the light signals drifts corresponding to an ambient temperature change.

3. The system of claim 1, wherein the tunable filter is operative to filter out at least some radiation having wavelengths different from the second wavelength value.

4. The system of claim 3, wherein the at least some radiation comprises background radiation.

5. The system of claim 1, wherein the filter characteristic of the tunable filter is adjusted by the filter tuning circuitry to track a wavelength change of the light signals.

6. The system of claim 1, wherein a linewidth of the tunable filter corresponds to a laser intrinsic linewidth of the light source.

7. The system of claim 1, wherein the filter tuning circuitry is further operative to determine, based on a look up table, an extent to which the tunable filter is to be adjusted.

8. The system of claim 7, wherein the look up table is based on a relation between a plurality of wavelengths and a plurality of angles of incidence associated with the tunable filter.

9. The system of claim 8, wherein the filter tuning circuitry is operative to adjust the filter characteristic of the tunable filter by matching the monitored wavelength with an angle of incidence of the plurality of angles of incidence associated with the tunable filter.

10. The system of claim 1, wherein the receiving system comprises a first optic and a second optic, and wherein the tunable filter is positioned between the first and second optics.

11. The system of claim 1, wherein the tunable filter comprises an interference filter positioned based on the monitored wavelength.

12. The system of claim 1, wherein the tunable filter comprises a liquid crystal, and wherein the filter tuning circuitry is operative to adjust the filter characteristic of the tunable filter by adjusting a voltage across the liquid crystal based on the monitored wavelength.

13. A method comprising:
   monitoring a wavelength of light signals provided by a light source to a light signal scanner of a light ranging and detection (LiDAR) system;
   determining that the monitored wavelength of the light signals drifts from a first wavelength value to a second wavelength value, wherein the second wavelength value is different from the first wavelength value; and
   adjusting a filter characteristic of a tunable filter based on the monitored wavelength such that a pass band of the tunable filter matches the second wavelength value, wherein the tunable filter is disposed in a return path of the LiDAR system.

14. The method of claim 13, wherein the monitored wavelength of the light signals drifts corresponding to an ambient temperature change.

15. The method of claim 13, further comprising:
   filtering out, by the tunable filter, at least some radiation having wavelengths different from the second wavelength value.

16. The method of claim 13, further comprising:
   tracking a wavelength change associated with the light signals.

17. The method of claim 13, wherein adjusting the filter characteristic of the tunable filter comprises:
   matching the monitored wavelength with an angle of incidence of a plurality of angles of incidence associated with the tunable filter.

18. The method of claim 13, further comprising:
   determining, based on a look up table, an extent to which the tunable filter is to be adjusted.

19. The method of claim 18, wherein the look up table is based on a relation between a plurality of wavelengths and a plurality of angles of incidence associated with the tunable filter.

20. The method of claim 13, wherein the tunable filter comprises an interference filter positioned based on the monitored wavelength.

21. The method of claim 13, wherein the tunable filter comprises a liquid crystal, and wherein adjusting the filter characteristic of the tunable filter comprises:
   adjusting a voltage across the liquid crystal based on the monitored wavelength.

* * * * *